(12) United States Patent
Bernreuter et al.

(10) Patent No.: US 10,866,010 B2
(45) Date of Patent: Dec. 15, 2020

(54) HIGH-EFFICIENCY CONDENSING WATER HEATER

(71) Applicant: Bradford White Corporation, Ambler, PA (US)

(72) Inventors: Wade Bernreuter, Lowell, MI (US); Bruce Hill, Middleville, MI (US); Matt Polhemus, Hastings, MI (US)

(73) Assignee: Bradford White Corporation, Ambler, PA (US)

( * ) Notice: Subject to any disclaimer, the term of this patent is extended or adjusted under 35 U.S.C. 154(b) by 55 days.

(21) Appl. No.: 15/767,733

(22) PCT Filed: Oct. 10, 2016

(86) PCT No.: PCT/US2016/056214
§ 371 (c)(1),
(2) Date: Apr. 12, 2018

(87) PCT Pub. No.: WO2017/066107
PCT Pub. Date: Apr. 20, 2017

(65) Prior Publication Data
US 2018/0292110 A1    Oct. 11, 2018

Related U.S. Application Data

(60) Provisional application No. 62/240,027, filed on Oct. 12, 2015.

(51) Int. Cl.
*F24H 8/00* (2006.01)
*F24H 9/00* (2006.01)
(Continued)

(52) U.S. Cl.
CPC ............... *F24H 8/00* (2013.01); *F24H 1/205* (2013.01); *F24H 1/206* (2013.01); *F24H 9/0031* (2013.01);
(Continued)

(58) Field of Classification Search
CPC ....................................................... F24H 8/00
See application file for complete search history.

(56) References Cited

U.S. PATENT DOCUMENTS 2,414,875 A * 1/1947 Horne .................... F24H 1/205
122/18.3
2,832,320 A    4/1958 Thome et al.
(Continued)

FOREIGN PATENT DOCUMENTS

AU    2011362014 A1    10/2011
CN    202254234 U    5/2012
(Continued)

OTHER PUBLICATIONS

International Search Report and Written Opinion for International Application No. PCT/US2016/056214, dated Jan. 23, 2017—10 pages.
(Continued)

*Primary Examiner* — Nathaniel Herzfeld
(74) *Attorney, Agent, or Firm* — RatnerPrestia

(57) ABSTRACT

Aspects of the invention relate to water heaters including a water storage tank having a top wall, a bottom wall, and a side wall extending between the top wall and the bottom wall; a combustion chamber extending below the bottom wall of the water storage tank and a heat exchanger configured to receive combustion gases and to transfer heat to water in the water storage tank. The heat exchanger includes a first pass flue extending through the water storage tank and a plurality of second pass flues coupled to receive combustion gases from the first pass flue. The second pass flues extending through the water storage tank and having a straight top portion, a curved bottom portion, and a longitudinal axis residing in a plane. The curved bottom portion of the second pass flues exits the water storage tank through
(Continued)

at least one aperture defined in the side wall of the water storage tank.

17 Claims, 14 Drawing Sheets

(51) Int. Cl.
*F24H 1/20* (2006.01)
*F24H 9/02* (2006.01)
*F24H 9/12* (2006.01)
*F24H 9/14* (2006.01)

(52) U.S. Cl.
CPC ............... *F24H 9/02* (2013.01); *F24H 9/124* (2013.01); *F24H 9/146* (2013.01); *Y02B 30/102* (2013.01)

(56) References Cited

U.S. PATENT DOCUMENTS

| 2007/0181081 | A1* | 8/2007 | Missoum | F24H 1/206 |
| | | | | 122/13.01 |
| 2009/0301406 | A1* | 12/2009 | Ritsema | F24H 1/205 |
| | | | | 122/13.01 |
| 2010/0101508 | A1* | 4/2010 | Tanbour | F16J 3/041 |
| | | | | 122/18.5 |
| 2011/0214621 | A1* | 9/2011 | Boros | F24H 1/18 |
| | | | | 122/18.31 |
| 2012/0291719 | A1* | 11/2012 | Steinhafel | F24H 1/00 |
| | | | | 122/18.3 |

FOREIGN PATENT DOCUMENTS

| EP | 0292142 A1 | 11/1988 |
| EP | 1369647 A2 | 12/2003 |

OTHER PUBLICATIONS

International Preliminary Report on Patentability for International Application No. PCT/US2016/056214, dated Apr. 17, 2018, 8 pages.
Great Britain Examination Report for Great Britain Application No. GB1806587.0, dated Mar. 6, 2020, 2 pages.
Great Britain Examination Report for Great Britain Application No. GB1806587.0, dated Nov. 29, 2019, 3 pages.
Great Britain Combined Search and Examination Report for Great Britain Application No. GB2013252.8, dated Sep. 14, 2020, 3 pages.

* cited by examiner

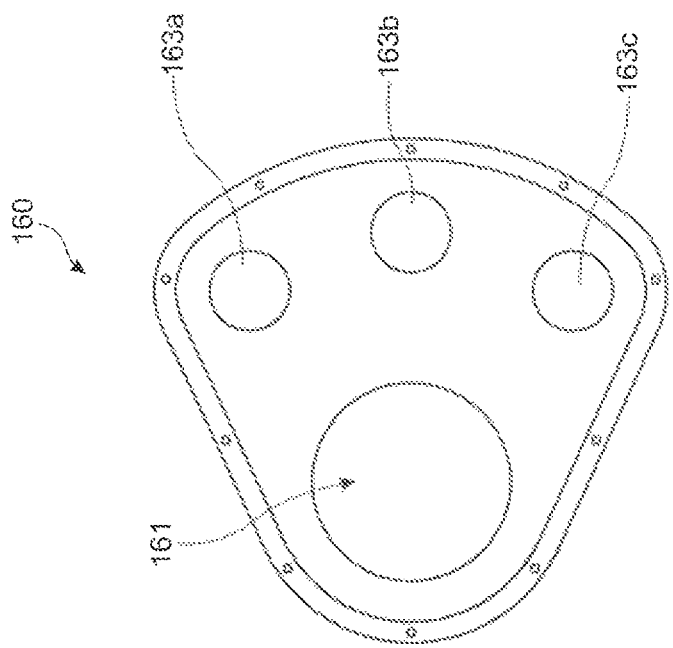
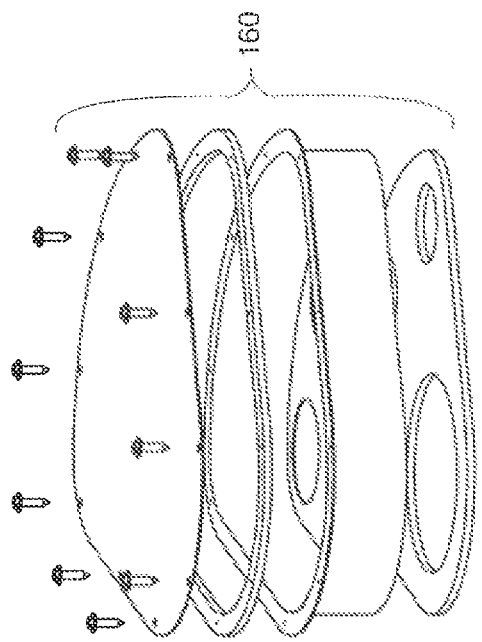
FIG. 3B
FIG. 3A

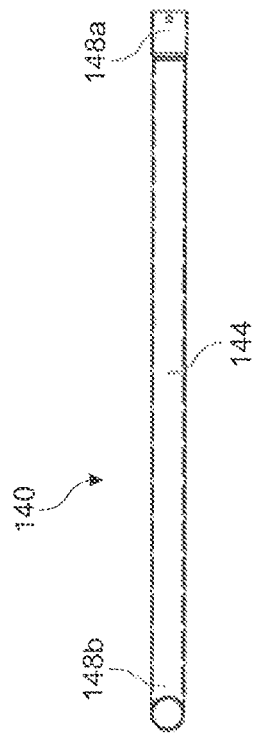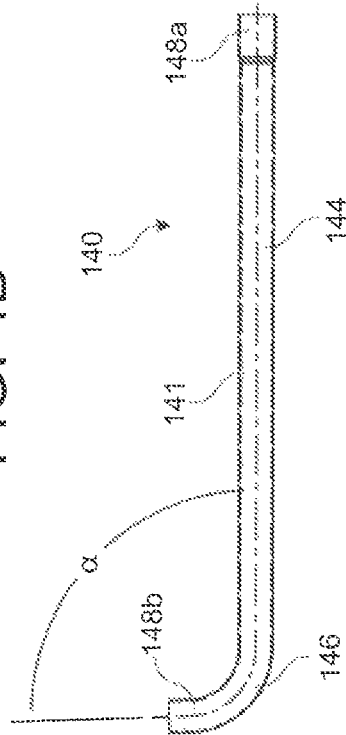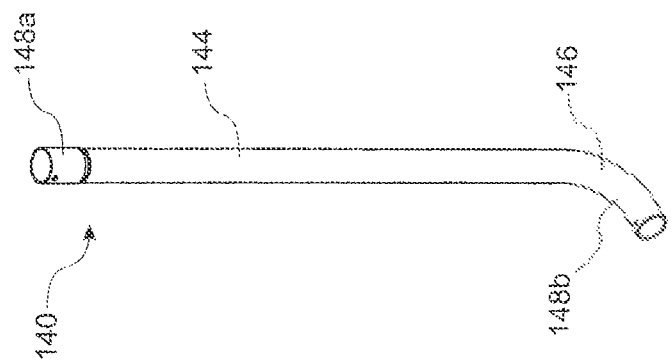

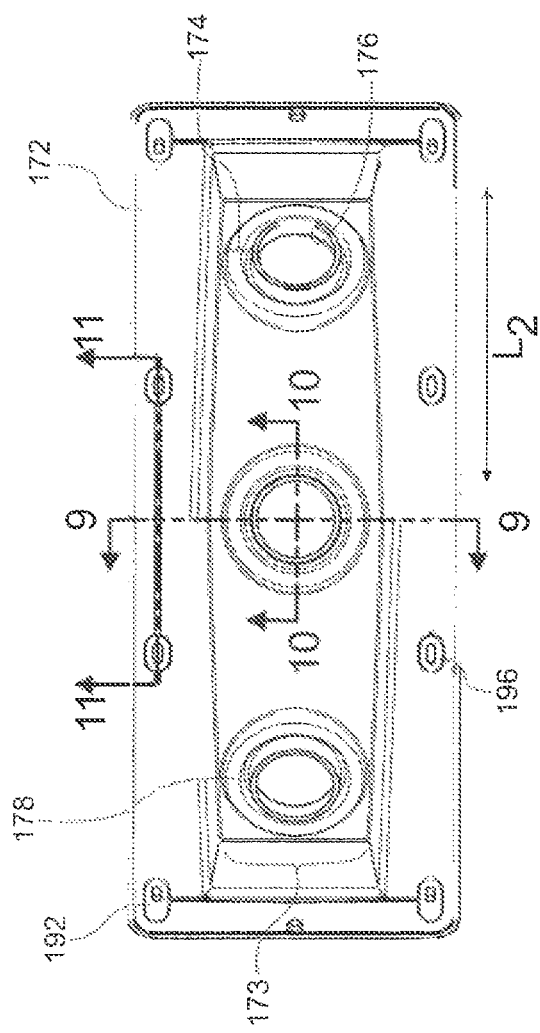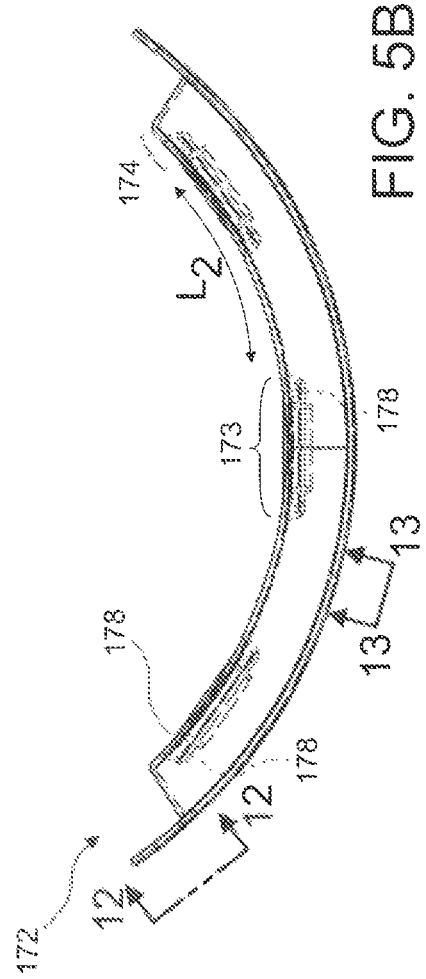

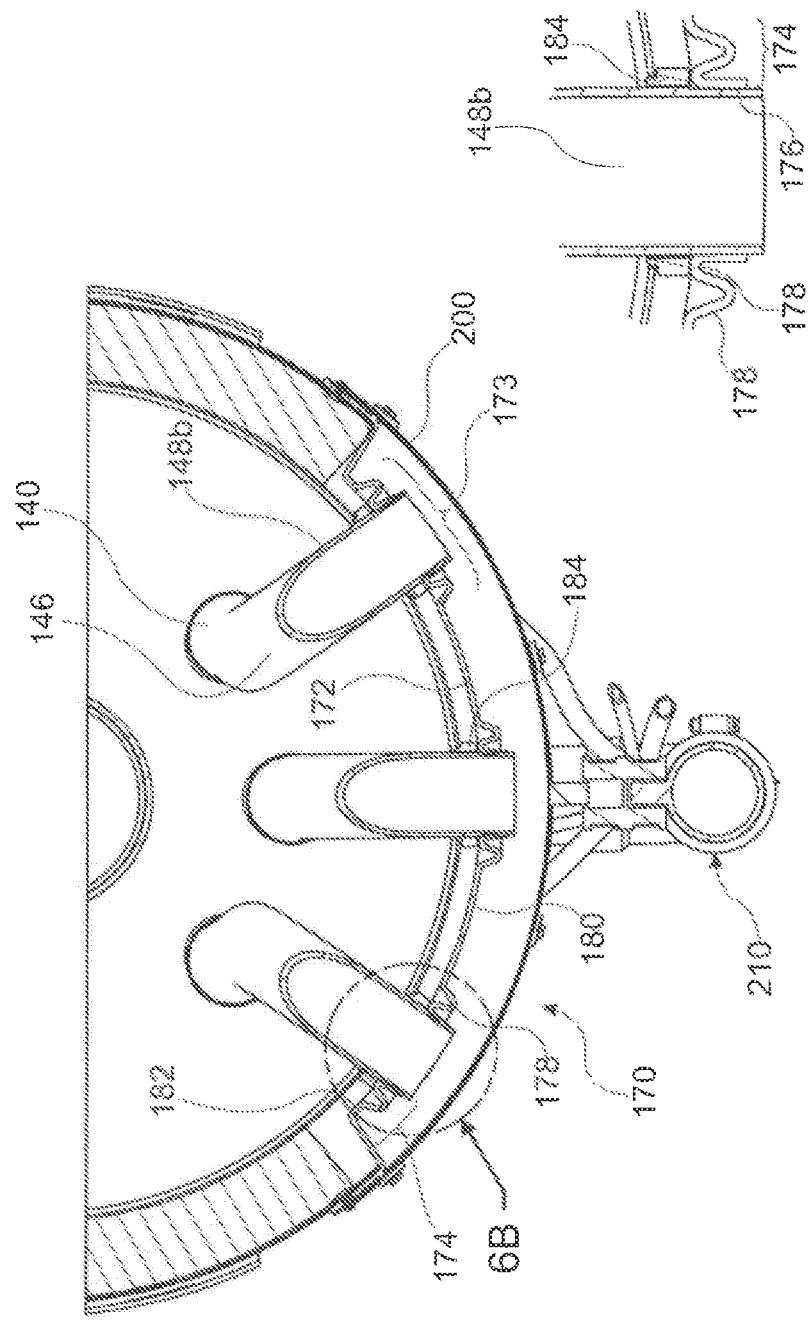

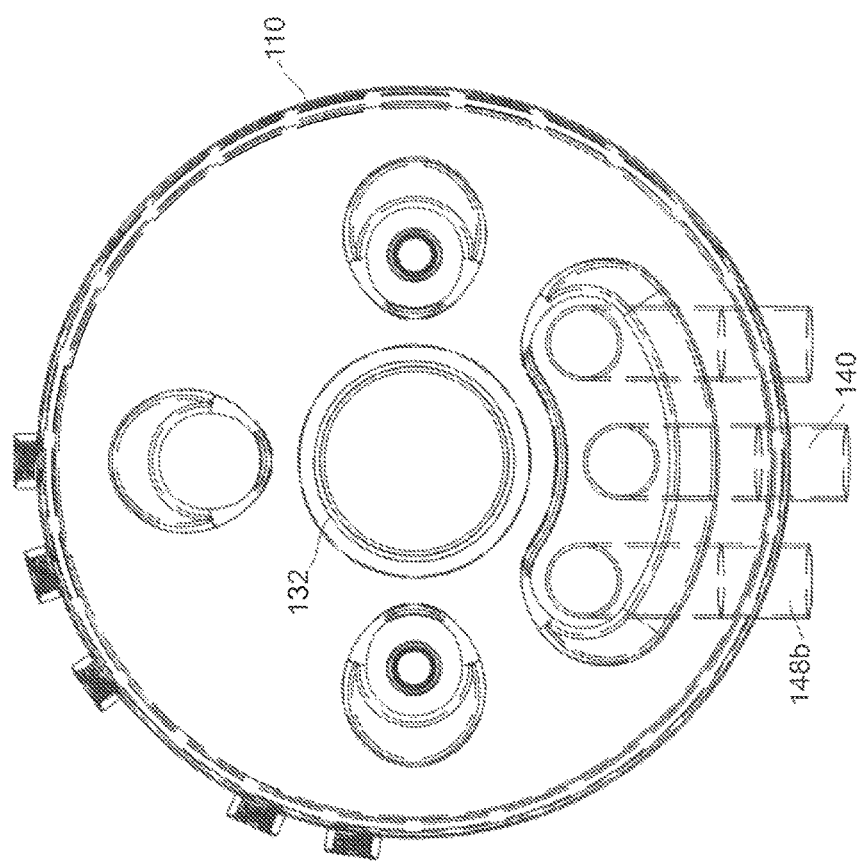

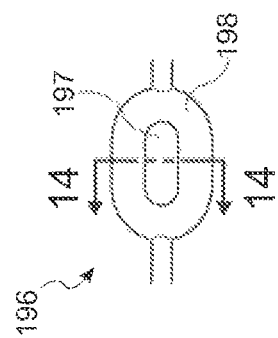
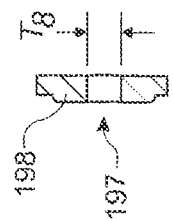
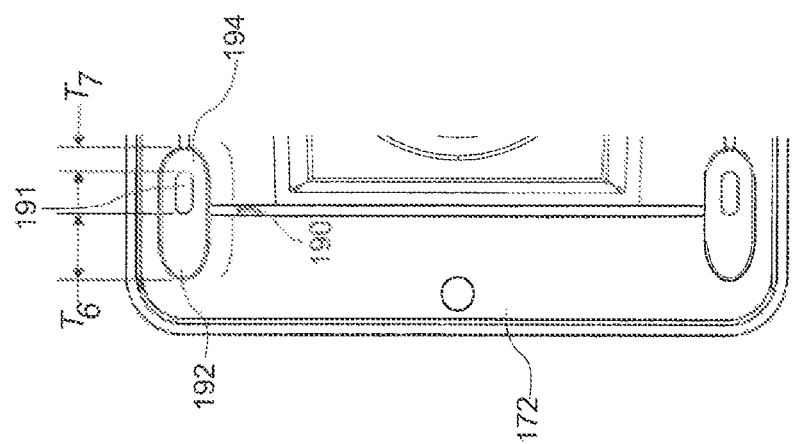
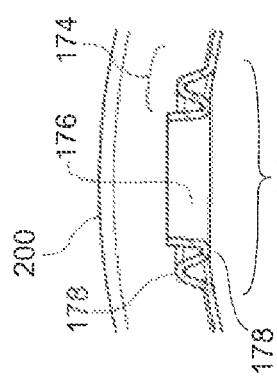
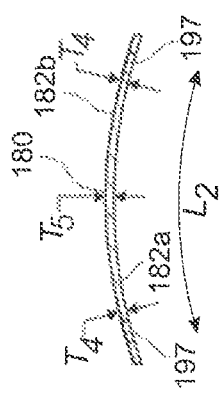

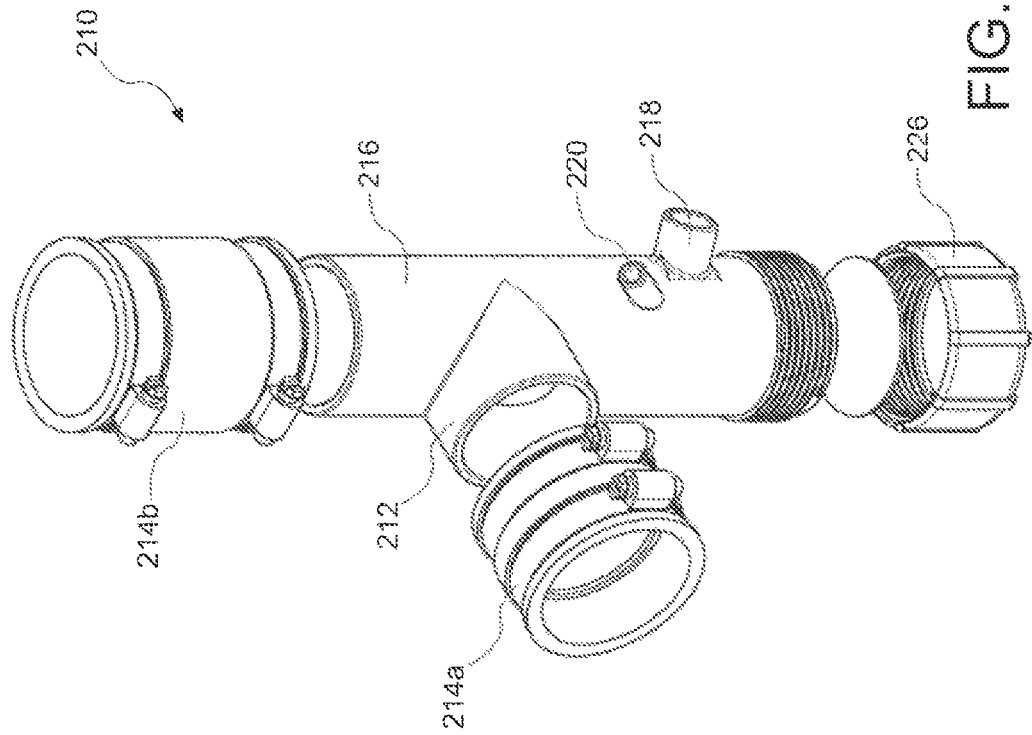

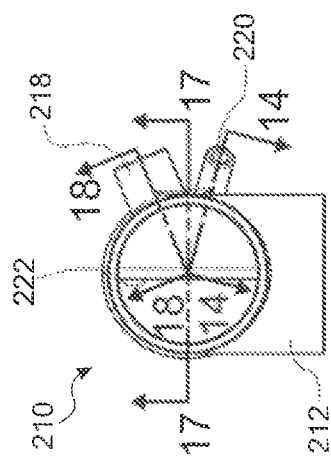
FIG. 16D
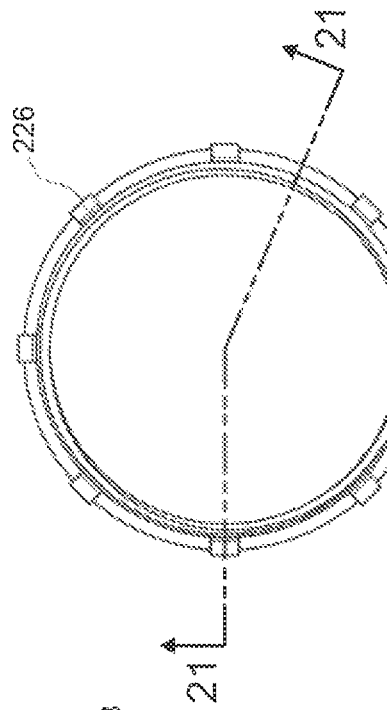
FIG. 16E
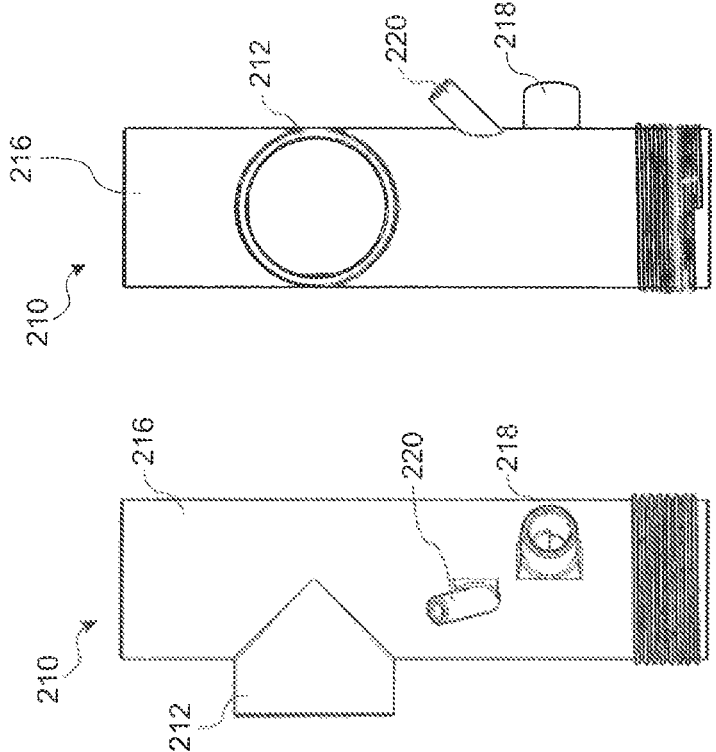
FIG. 16C
FIG. 16B

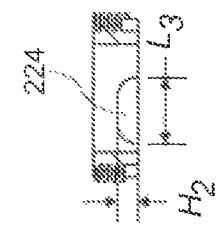
FIG. 20
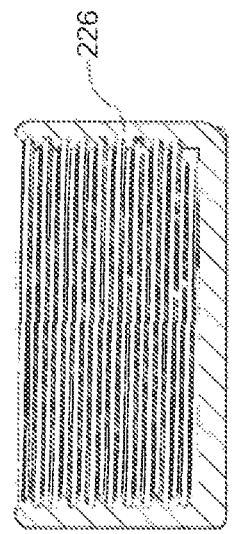
FIG. 21
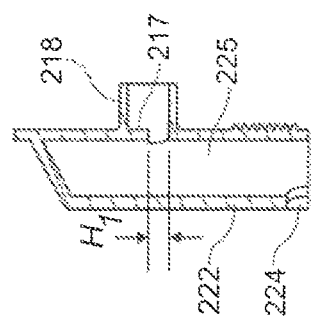
FIG. 18
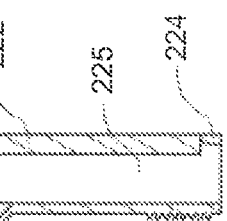
FIG. 19
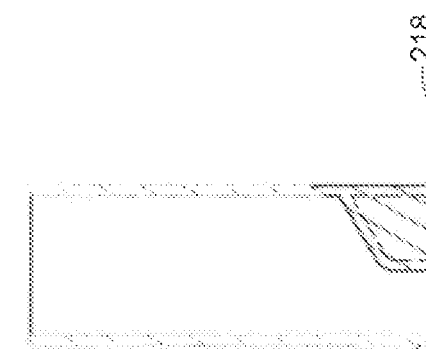
FIG. 17
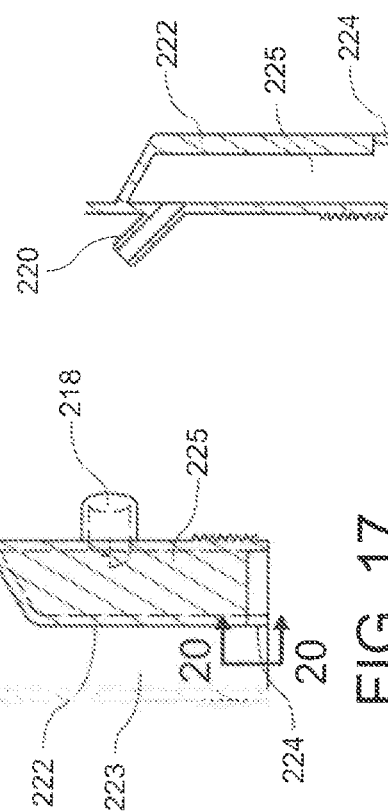

HIGH-EFFICIENCY CONDENSING WATER HEATER

CROSS-REFERENCE TO RELATED APPLICATION

This application is the U.S. national phase application of PCT Application No. PCT/US2016/056214, filed Oct. 10, 2016, which is related to and claims the benefit of U.S. Provisional Application No. 62/240,027, entitled HIGH-EFFICIENCY CONDENSING WATER HEATER filed on Oct. 12, 2015, the contents of which are incorporated herein by reference.

FIELD OF THE INVENTION

This disclosure relates to condensing water heaters and, more particularly to, condensing water heaters employing a plurality of flue tubes and an exhaust manifold.

BACKGROUND OF THE INVENTION

Commercial and residential water heaters typically heat water by generating tens of thousands, and even hundreds of thousands, of BTUs. For many years, manufacturers of water heaters, and especially manufacturers of water heaters to be used in commercial applications, have sought to increase the efficiency of the exchange of this heat energy from burned fuel to the water contained in the water heater. Accordingly, maximized heat exchange efficiency has long been an object of commercial and residential water heater manufacturers.

As heat exchange efficiency increases, however, such increased efficiency gives rise to the problems associated with condensation of water vapor from the products of combustion. More specifically, upon burning of a mixture of fuel and air, water is formed as a constituent of the products of combustion. It is recognized that as the temperatures of the combustion gases decrease as the result of successful exchange of heat from the combustion gases to water in the water heater, the water vapor within the combustion gases tends to be condensed in greater quantities. In other words, as the temperatures of the combustion gases decrease as a direct result of increasingly efficient exchange of heat energy to the circulated water, the amount of condensate forming on the heat exchange surfaces also increases.

Commercial and residential water heaters can be designed to operate below the efficiencies at which increased quantities of condensate are likely to form (i.e., below the condensing mode). To do so, however, compromises the efficiency of the water heater. Accordingly, there continues to be a need for improved water heating systems having targeted heat exchange efficiency and configuration for achieving such efficiency.

SUMMARY OF THE INVENTION

Aspects of the invention relate to water heaters and parts thereof, as well as methods of manufacturing said water heaters.

In accordance with one aspect, the invention provides a water heater that includes a water storage tank configured to store water to be heated. The water storage tank has a top wall, a bottom wall, and a side wall extending between the top wall and the bottom wall. The water heater further includes a combustion chamber extending below the bottom wall of the water storage tank and a heat exchanger configured to receive combustion gases from the combustion chamber and to transfer heat to water stored in the water storage tank. The heat exchanger includes a first pass flue coupled to receive combustion gases from the combustion chamber, the first pass flue extending through the water storage tank from the bottom wall of the water storage tank to the top wall of the water storage tank; and a plurality of second pass flues coupled to receive combustion gases from the first pass flue, the second pass flues extending through the water storage tank from the top wall of the water storage tank toward the bottom wall of the water storage tank. Each of the second pass flues has a straight top portion, a curved bottom portion, and a longitudinal axis residing in a plane. The curved bottom portion of each of the second pass flues exits the water storage tank through at least one aperture defined in the side wall of the water storage tank.

According to one embodiment, the water heater may include a curved portion in which the at least one aperture is defined, and each of the second pass flues exits the water storage tank through the at least one aperture defined in the curved portion of the side wall. Each of the second pass flues may have a first end and a second end, wherein the longitudinal axis of each of the second pass flues at the first end forms an angle with the longitudinal axis at the second end that is between 90° and 130°. A distance between the curved portions of the second pass flues may be smaller than a distance between the second ends of the second pass tubes. Each of the second pass flues may be contained within a first half of the water storage tank, with the first half of the water storage tank extending in a direction along a length of the first pass flue. An exhaust conduit may be positioned to receive combustion gas from each of the second pass flues, the exhaust conduit being positioned proximal to the first half of the water storage tank.

In accordance with another aspect, the invention provides a water heater that includes a water storage tank configured to store water to be heated, the water storage tank having a top wall, a bottom wall, and a side wall extending between the top wall and the bottom wall, the side wall including a curved portion. The water heater further including a heat exchanger configured to transfer heat to water stored in the water storage tank. The heat exchanger having a first pass flue extending between the bottom wall of the water storage tank and the top wall of the water storage tank, and a plurality of second pass flues coupled to receive combustion gases from the first pass flue. Each of the plurality of second pass flues exiting the water storage tank through the side wall of the water storage tank. The water heater also includes an exhaust manifold associated with the side wall of the water storage tank, the exhaust manifold including a gasket defining inlets for receiving each of the second pass flues, and a cover defining an outlet from the exhaust manifold.

According to one embodiment, the tank wall, the gasket, and the cover each have a curvature, the curvature of the gasket and the curvature of the cover each being approximately equal to the curvature of the curved wall. Each of the inlets of the gasket may further include at least one flexible portion and at least one contacting surface, the at least one contacting surface being connected to the at least one flexible portion. The flexible portion optionally has one or more bends. The at least one flexible portion of each of the inlets may have two or more bends. The contacting surface of the at least one flexible portion may be configured to contact one of the plurality of flues. At least a portion of the outlet of the cover can be positioned at a lower elevation relative to each of the inlets of the gasket. The gasket optionally has a length and a thickness, optionally with a sealing bead with the thickness of the sealing bead varying along the length of the sealing bead. The gasket sealing bead may be configured to connect with side attachment pads and center attachment pads.

In accordance with yet a further aspect of the invention, a water heater includes a water storage tank configured to store water to be heated. The water storage tank having a top wall, a bottom wall, and a side wall extending between the top wall and the bottom wall, the side wall including a curved portion. Additionally, the water heater includes a heat exchanger configured to transfer heat to water stored in the water storage tank. The heat exchanger including a first pass flue extending between the bottom wall of the water storage tank and the top wall of the water storage tank, and a plurality of second pass flues coupled to receive combustion gases from the first pass flue. Each of the plurality of second pass flues exiting the water storage tank through the side wall of the water storage tank. The heat exchanger further having an exhaust manifold associated with the side wall of the water storage tank. The exhaust manifold including a gasket defining inlets for receiving each of the second pass flues, and a cover defining an outlet from the exhaust manifold.

According to one embodiment, each of the second pass flues can have a first end and a second end, the second end terminating within the exhaust manifold. The second pass flues optionally exit through the curved portion of the side wall. The second ends of the second pass flues can be parallel to each other. The gasket optionally forms a plane associated with non-curved portion of the side wall. The curved portion of the side wall can have a curvature and the gasket can have a curvature, the curvature of the gasket being approximately equal to the curvature of the curved portion of the side wall. A pressure switch port may be provided for sensing a magnitude of pressure associated with the exhaust manifold.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIGS. 3A-3B depict a flue chamber in accordance with aspects of the present invention;

FIGS. 4A-4C depict a second pass flue according to aspects of the present invention;

FIGS. 5A-5B depict an embodiment of a gasket for an exhaust manifold in accordance with aspects of the present invention;

FIGS. 6A and 6B are cross-sectional views of a water heater employing an exhaust manifold having the gasket of FIGS. 5A and 5B;

FIG. 8 is cross-sectional view of a bottom region of a water storage tank having parallel second pass flues according to aspects of the invention;

FIG. 10 is a cross-sectional view of an inlet of the gasket of FIG. 5A;

FIG. 11 is a cross-sectional view of the gasket and sealing bead, along the length of the sealing bead, of FIG. 5A;

FIG. 12 is a cross-sectional view of a portion of the gasket of FIG. 5B;

FIG. 13 is a cross-sectional view of a center attachment portion of the gasket of FIG. 5B;

FIG. 14 is a cross-sectional view of the attachment point of the gasket of FIG. 13;

FIG. 16A is a perspective view of an embodiment of a condensation trap according to aspects of the present invention;

FIGS. 16B and 16C depict side views of the condensation trap of FIG. 16A;

FIG. 16D is a cross-sectional, top view of the condensation trap of FIG. 16A;

FIG. 16E is a cross-sectional view of a bottom portion of the condensation trap of FIG. 16A;

FIG. 17 is a cross-sectional view of a portion of the condensation trap of FIG. 16D;

FIG. 18 is an enlarged view of a portion of the condensation trap depicted in FIG. 17;

FIG. 19 is an enlarged view of another portion of the condensation trap depicted in FIG. 17;

FIG. 20 is a cross-sectional view of the passageway of the dividing wall in the condensation trap depicted in FIG. 17; and FIG. 21 is a cross-sectional view of the bottom portion of the condensation trap of FIG. 16E.

DETAILED DESCRIPTION OF THE INVENTION

Figure 1:
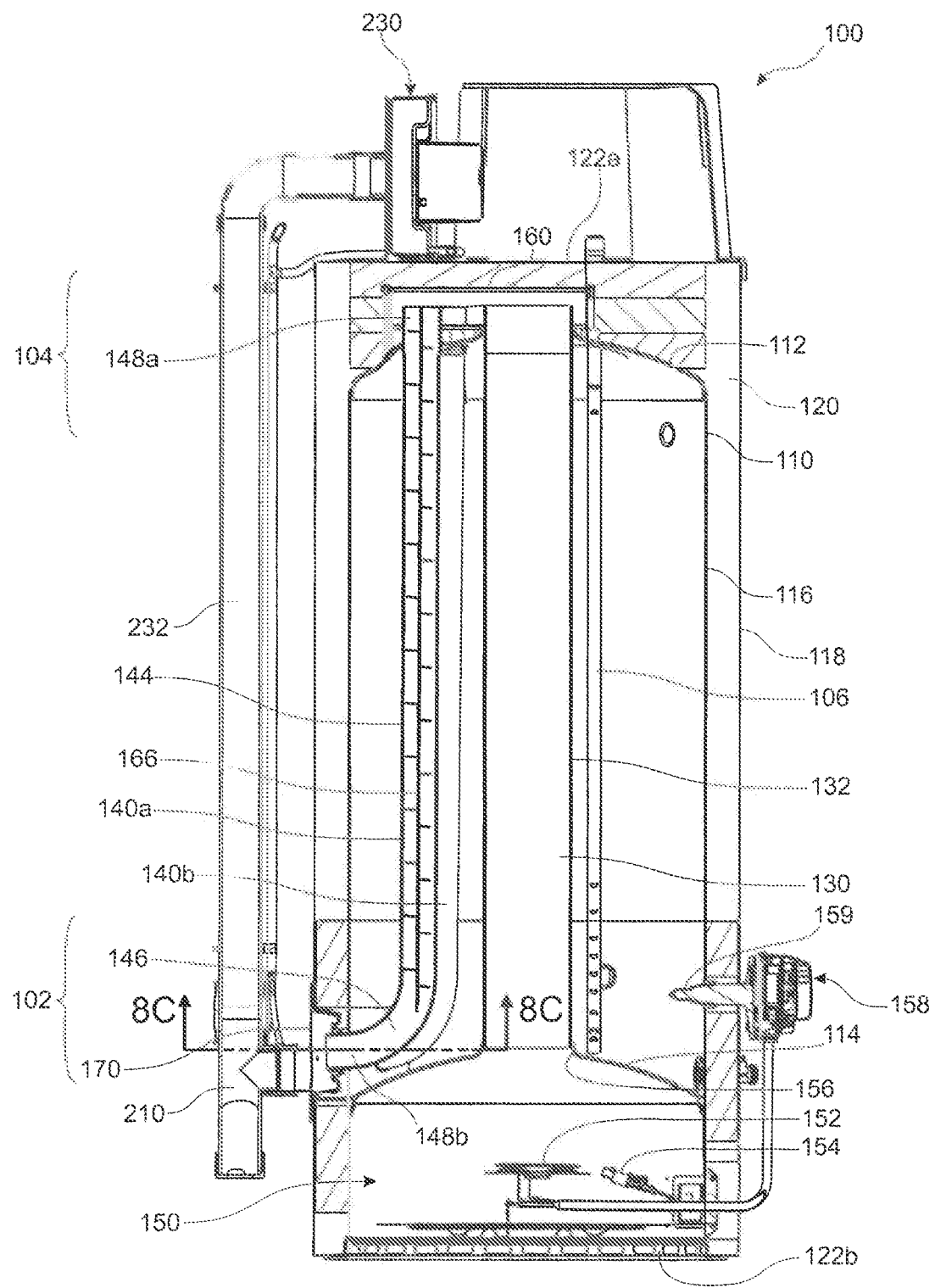
FIG. 1 is a cross-sectional view of an embodiment of a condensing water heater in accordance with aspects of the present invention.
Figure 2:
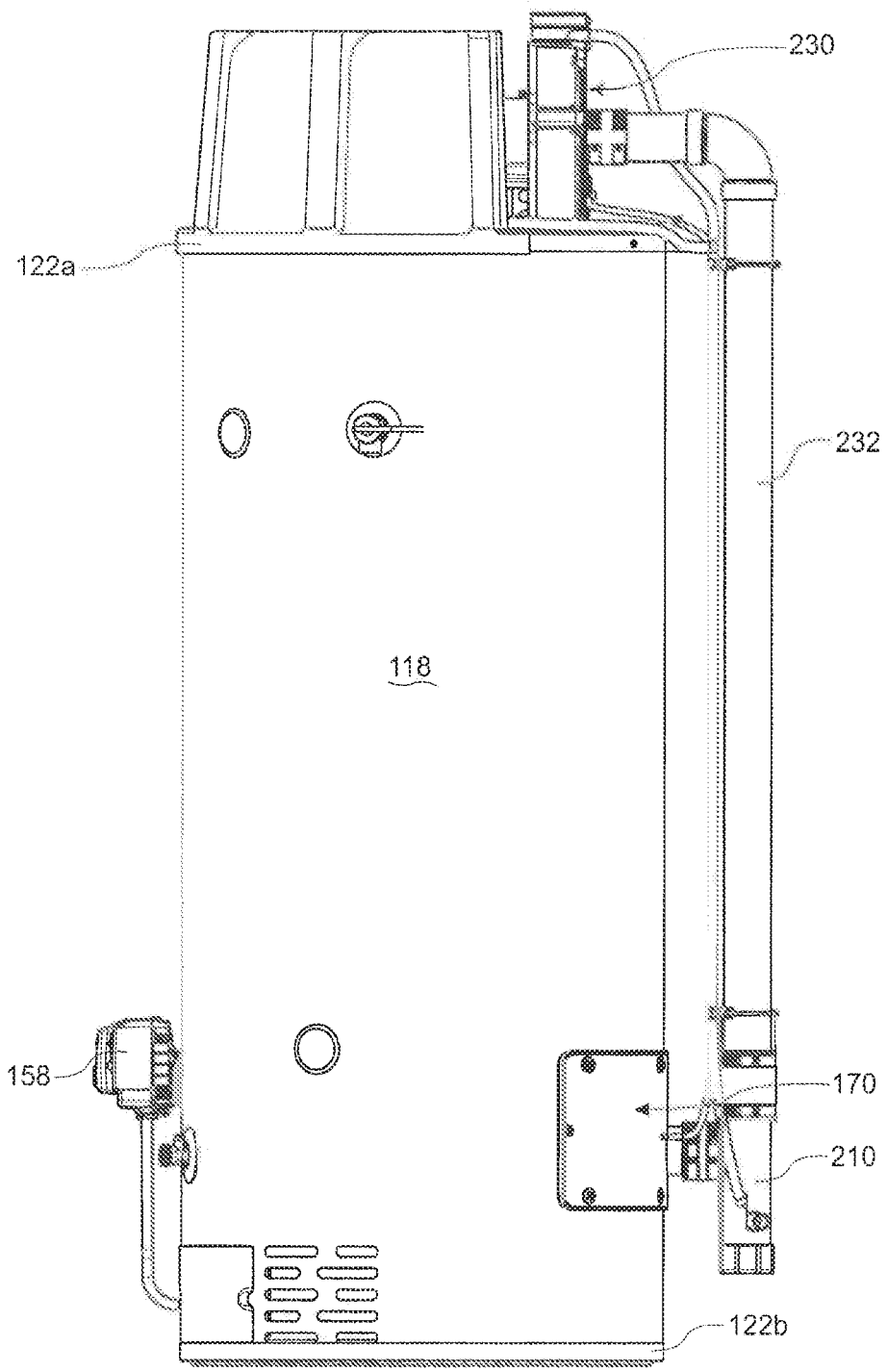
FIG. 2 is a side view depicting the condensing water heater of FIG. 1.
Figure 7:
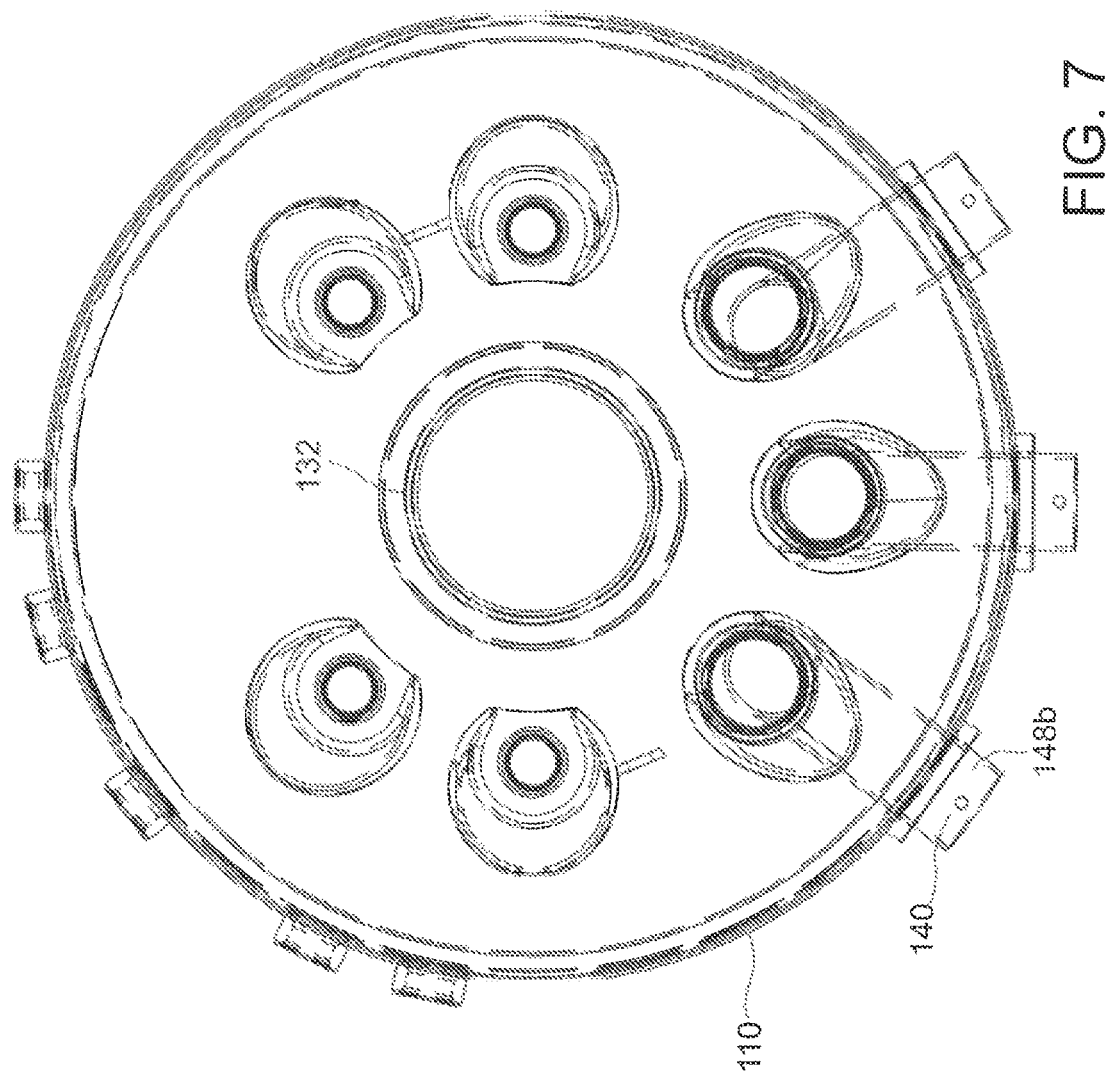
FIG. 7 is a cross-sectional view of a bottom region of a water storage tank having radially extending second pass flues in accordance with aspects of the present invention.

A detailed description of various, non-limiting embodiments of the invention follows. Although the invention is illustrated and described herein with reference to specific embodiments, the invention is not intended to be limited to the details shown. Rather, various modifications may be made in the details within the scope and range of equivalents of the claims and without departing from the invention.

Aspects of the present invention advantageously provide high-efficiency and/or condensing water heaters including a heat exchanger that facilitates uniform application and easy inspection of anticorrosive coatings. The condensing water heaters of the present invention may also have an exhaust manifold that receives exhaust from a plurality of flues extending through a curved wall of a storage tank, while providing an effective seal (e.g., an air tight seal) between the plurality of flues and the exhaust manifold.

Referring generally to non-limiting exemplary embodiments selected for illustration in the figures, a water heater 100 may include a water storage tank 110 configured to store water to be heated. The water storage tank 110 has a top wall 112, a bottom wall 114, and a side wall 116 extending between the top wall 112 and the bottom wall 114. Water heater 100 may further include a combustion chamber 150 extending below the bottom wall 114 of the water storage tank 110, and a heat exchanger 130 configured to receive combustion gases from the combustion chamber 150 and to transfer heat to water stored in the water storage tank 110. The heat exchanger 130 may include a first pass flue 132 coupled to receive combustion gases from the combustion chamber 150, the first pass flue 132 may extend through the water storage tank 110 from the bottom wall 114 of the water storage tank 110 to the top wall 112 of the water storage tank 110, and a plurality of second pass flues 140 coupled to receive combustion gases from the first pass flue 132. The second pass flues 140 may extend through the water storage tank 110 from the top wall 112 of the water storage tank 110 toward the bottom wall 114 of the water storage tank 110, wherein each of the second pass flues 140 may have a straight top portion 144, a curved bottom portion 146, and a longitudinal axis 141 residing in a plane. The curved bottom portion 146 of each of the second pass flues 140 may exit the water storage tank 110 through at least one aperture (e.g., defined by inlet 173) defined in the side wall 116 of the water storage tank 110.

Referring to FIG. 1, water heater 100 includes a water storage tank 110, a combustion chamber 150, a heat exchanger 130, an exhaust manifold 170 and a condensation trap 210.

Water storage tank 110 is configured to store water that is to be heated. Water storage tank 110 includes a top wall 112, a bottom wall 114, and a side wall 116 extending between top wall 112 and bottom wall 114. Generally, top wall 112, bottom wall 114, and side wall 116 may form any shape that permits water to be stored therein. Although FIG. 1 depicts top wall 112 as concave and bottom wall 114 as convex, top wall 112 and/or bottom wall 114 may be convex, flat, conical, or any other shape suitable for water heater designs. Preferably, sidewall 116 is curved and may, e.g., form a cylindrical periphery of water storage tank 110. In one embodiment, however, sidewall 116 optionally forms a rectangular prism. Sidewall 116 may also have flat side portions and/or curved side portions.

Water storage tank 110 includes one or more cold water inlets and/or one or more hot water outlets. The cold water inlet may be configured to receive a diptube 106, which may be positioned within water storage tank 110 for evenly delivering unheated water into water storage tank 110. Preferably, diptube 106 provides cold water in a manner that increases mixing of the water within water storage tank 110 and/or minimizes cold and hot spots within water storage tank 110. The hot water outlet may be coupled to a heated water supply line for distributing heated water from water storage tank 110. An outlet diptube may be coupled to an opposing end of the hot water outlet and positioned within water storage tank 110. In one embodiment, the hot water diptube includes a circular port for drawing heated water from a top region 104 of water storage tank 110. Additionally or alternatively, a sacrificial anode rod may be coupled to the end of the hot water and/or cold water diptube for limiting corrosion of a metallic water storage tank and/or pipes in communication with water storage tank 110.

An outer jacket or shell 118 of water heater 100 encapsulates water storage tank 110 to form an annular cavity 120 therebetween. The annular cavity 120 may include various insulating materials such as foam insulation, insulating fibers, and the like. Outer shell 118 may be shaped similar to the water storage tank 110, such that the annular cavity 120 may be, preferably, substantially uniform in thickness. A top cover 122*a* and/or bottom cover 122*b* is fastened to the outer shell 118, thereby enclosing water storage tank 110 and/or the annular cavity 120.

Although water heater 110 is configured as an upward fired water heater, water heaters in accordance with present invention may be configured as an upward or downward fired water heaters. Accordingly, combustion chamber 150 may be positioned at elevations near a top region 104 or near a bottom region 102 of water heater 100. Combustion chamber 150 may extend below bottom wall 114 of water storage tank 110. For example, combustion chamber 150 may be defined by bottom wall 114, side wall 116, and bottom cover 122*b*. Alternatively, combustion chamber 150 may be defined by one or more discrete walls that may extend adjacent to bottom wall 114, side wall 116, and/or bottom cover 122*b*. In one embodiment, combustion chamber 150 buttresses bottom wall 114 of water storage tank 110. In another embodiment, combustion chamber 150 has a shape not corresponding to bottom wall 114, side wall 116, and/or bottom cover 122*b*.

Combustion chamber 150 includes a gas burner 152 and a pilot 154, positioned adjacent the gas burner 152 for igniting the gas fuel. Although combustion chamber 150 is configured to combust gas fuel, other embodiments of the present invention include combustion chambers configured to combust other fuels, such as oil and/or coal. Combustion chamber 150 is in fluid communication with a heat exchanger 130, which is positioned at least partially within the interior of water storage tank 110, such that the combustion gas flows through at least a portion of the water storage tank 110. For example, heat exchanger 130 may extend from a bottom region 102 to a top region 104 of water storage tank 110.

Heat exchanger 130 is configured to receive combustion gases from combustion chamber 150 and to transfer heat to the water stored in water storage tank 110. Heat exchanger 130 may be configured as a two-pass heat exchanger, such that the combustion gases travel generally from one end region (e.g., bottom region 102) of the water storage tank 110 to the other end region (e.g., top region 104) of water storage tank 110 two times. In one embodiment, at least one pass of heat exchanger 130 extends from bottom wall 114 to top wall 112 of water storage tank 110. Those skilled in the art will appreciate that other heat exchanger configurations, such as, e.g., triple pass, quadruple pass, and shell and tube heat exchangers, may be employed within water heater 100 without departing from the present invention.

Heat exchanger 130 includes a first pass flue 132 and a plurality of second pass flues 140. First pass flue 132 extends through water storage tank 110, e.g., from bottom wall 114 of water storage tank 110 to top wall 112 of water storage tank 110. First pass flue 132 is coupled to receive combustion gases from the combustion chamber 150. First pass flue 132 may be coupled to a portion (e.g., highest portion 156) of combustion chamber 150 that is at a higher elevation than the rest of combustion chamber 150.

Referring to FIGS. 3A-3B, first pass flue 132 may be coupled to a combustion gas collector 160, such that combustion gases leaving first pass flue 132 enter combustion gas collector 160. First pass flue 132 may extend into combustion gas collector 160 beyond first pass flue aperture 161. Combustion gas collector 160 has a plurality of second pass flue apertures 163 for receiving the plurality of second pass flues 140. In one embodiment, each second pass flue aperture 163 of combustion gas collector 160 corresponds to one of the second pass flues 140 such that, e.g., a first second pass flue 140a passes through aperture 163a, a second pass flue 140b passes through aperture 163b, and a third second pass flue 140c passes through aperture 163c. Second pass flues 140 may extend through second pass flue apertures 163 and into combustion gas collector 160.

In one embodiment, where second pass flues 140 extend into combustion gas collector 160, the end portion 148a has one or more holes extending through second pass flues 140 such that if condensation accumulates in the combustion gas collector 160, such condensation travels by way of gravity into second pass flues 140. First pass flue 132 may extend into combustion gas collector 160 more than each of second pass flues 140 extend into combustion gas collector 160. For example, first pass flue 132 may extend to a higher elevation than any of second pass flues 140, thereby promoting cooler air and/or condensate to flow into second pass flues 140. In one embodiment, second pass flues 140 do not extend into combustion gas collector 160 and/or through second pass flue apertures 163, but are in fluid communication with gas collector 160 by way of coupling and/or attachment to an outer surface of gas collector 160. Additionally or alternatively, second pass flues 140 may have an enlarged circumference at one of or both of the end portions 148 of the second pass flues 140. For example, the end portions 148a of second pass flues 140 that pass into and/or through apertures 163 may have a larger circumference than the circumference of second pass flues 140. In one embodiment, the enlarged circumference of end portions 148a extends along longitudinal axis 141 of second pass flues 140 for a length corresponding to the depth of aperture 163.

Water heater 100 also includes a plurality of second pass flues 140 extending through water storage tank 110 from a top region 104 to a bottom region 102, e.g., from top wall 112 of water storage tank 110 toward bottom wall 114 of water storage tank 110. The plurality of second pass flues 140 are coupled to receive combustion gases from first pass flue 130, e.g., by way of direct or indirect coupling to first pass flues 132 and/or by way of combustion gas collector 160. The plurality of second pass flues 140 may include any number of second pass flues, e.g., two second pass flues, three second pass flues, four second pass flues, etc. In one embodiment, water heater 100 includes three second pass flues 140.

Each of the second pass flues 140 may be contained within half of water storage tank 110, e.g., as defined by a section containing half the volume in water storage tank 110 extending in a direction along a length of first pass flue 132 and/or extending from top wall 112 to bottom wall 114. In one embodiment, each of the second pass flues 140 are contained within a section of water storage tank 110, extending from top wall 112 to bottom wall 114 and consisting of one third of the volume of water storage tank 110. An exhaust conduit 232—which is positioned to receive combustion gas from each of second pass flues 140—may be positioned proximal to the section of water storage tank 110 containing the plurality of second pass flues 140, e.g., the section containing half or one third of the volume of water storage tank 110.

Referring to FIGS. 4A-4C, each of second pass flues 140 may be configured to have a straight top 144 portion, a curved bottom portion 146, and a longitudinal axis 141 residing in a plane. The longitudinal axis 141 of each second pass flue 140 at one end portion 148a or 148b forms an angle (depicted as α in FIG. 4C) with the longitudinal axis 141 at the respective other end portion 148a or 148b that is between 90° and 130°. In one embodiment, the angle formed between the longitudinal axis 141 at one end 148a or 148b of each second pass flue 140 and the other respective end portion 148a or 148b of the respective second pass flue 140 is about 92°. Additionally or alternatively, the distance between the curved portions 146 of second pass flues 140 may be smaller than the distance between end portion 148b of second pass flues 140 extending towards side wall 116 of water storage tank 110. In one embodiment, however, the end portions 148b of the second pass flues 140 that extend through side wall 116 are parallel to each other. For example, FIG. 8 depicts an exemplary, non-limiting embodiment where the second pass flues 140 pass parallel to one another through a curved portion of side wall 116. However, in another embodiment, end portions 148b of second pass flues 140 pass parallel to one another through a non-curved portion of side wall 116.

Preferably, heat exchanger 130 is configured to obtain a desired flow of combustion gasses through heat exchanger 130 that promotes high heat transfer between the combustion gasses and the water stored in water storage tank 110 and/or to promote minimal condensation formation in sections of heat exchanger 130 where condensation is undesirable. Baffles 166 may be employed in first pass flue 132 and/or second pass flues 140, e.g., to reduce the velocity of the combustion gasses traveling therethrough. Additionally or alternatively, heat exchanger 130 may include fins, cores, and/or other features that promote heat transfer and/or modify combustion gas flow throughout the heat exchanger 130. For example, fins may be provided to promote turbulent flow, modify the flow rate, and/or increase the heat transfer surface area. Also, a core can be provided within one or more of the flues in order to decrease the area of the combustion gas flow passage and/or forcing combustion gas flow through fins.

The curved bottom portion 144 (or an end portion 148 extending therefrom) of each the second pass flues 140 exits water storage tank 110 through at least one aperture defined in side wall 116 (e.g., as defined by inlet 173 of gasket 172) of water storage tank 110. As described above, side wall 116 may have a curvature, a flat portion, and/or a corner to form any suitable shape for storing water within water storage tank 110. For example, side wall 116 may have a curvature that forms a cylinder. Alternatively, side wall 116 may have a curved portion and a non-curved (e.g., a flat) portion. In one embodiment, side wall 116 has a curved portion in which the at least one aperture (e.g., inlet 173 of gasket 172) is defined and each of the second pass flues 140 exits water storage tank 110 through the at least one aperture (e.g., as defined by inlet 173) defined in the curved portion of side wall 116. In another embodiment, second pass flues 140 exit through a flat portion of side wall 116, e.g., through a gasket that forms a plane associated with a non-curved portion of the side wall. In a further embodiment, side wall 116 has a curved portion forming a cylinder and a non-curved portion that second pass flues 140 exit through.

Each of the plurality of second pass flues 140 has an end portion 148 that may be oriented at an angle relative to the other end portions 148 of the second pass flues 140 and substantially normal to the curved side wall 116 or curved portion of side wall 116 of water storage tank 110. In one embodiment, substantially normal includes the second pass flues 140 passing through the curved side wall 116 at an angle deviating 20° or less from being perpendicular (e.g., 70-110°) to side wall 116. In another embodiment, substantially normal includes the second pass flues 140 passing through the curved side wall 116 at an angle deviating 10° or less (e.g., 80-100°) from being perpendicular to side wall 116. In yet a further embodiment, substantially normal includes the second pass flues 140 passing through the curved side wall 116 at an angle deviating 5° or less (e.g., 85-95°) from being perpendicular to side wall 116.

Second pass flues 140 may be sealed to water storage tank 110 to prevent leakage of the water stored within water storage tank 110. To promote a water tight seal, a mounting portion may be positioned adjacent to the apertures of side wall 116 and optionally positioned around one or more of the plurality of flues 140. For example, the mounting portion may include a cylindrical fitting 184 that is, preferably, sized to fit around the plurality of flues 140. Fitting 184 may be affixed to side wall 116 and/or end portions 148*b* of second pass flues 140 by way of any suitable means, such as, e.g., mechanical means including welding, binding, treading, riveting, etc. and non-mechanical means, such as, adhesives or the like. In one embodiment, fitting 184 is a spud that may be welded to side wall 116 and/or end portions 148.

Fitting 184 and/or the means for affixing fitting 184 to side wall 116 and/or end portions 148*b* often results in a deviation from the expected positioning of the second pass flues 140. For example, the welding affixing fitting 184 to side wall 116 and end portion 148*b* may be thicker in one area than in another area, thereby shifting the positioning of second pass flues 140. Exhaust manifold 170 is employed to produce a water tight, and preferably, an air tight seal between exhaust manifold 170 and second pass flues 140. Exhaust manifold 170 is advantageously configured to tolerate slight deviations in the positioning of the second pass flues 140, while providing a seal with second pass flues 140.

Referring to FIGS. 5A-6B, exhaust manifold 170 may be associated with side wall 116, and or portions thereof, of water storage tank 110. Exhaust manifold 170 may be configured to receive the plurality of second pass flues 140. Exhaust manifold 170 includes a gasket 172 defining inlets 173, which receive each end portion 148*b* of the second pass flues 140, and a cover 200 enclosing the ends portions 148*b* of second pass flues 140 and defining an outlet 201 for the delivery of combustion gases and condensation from exhaust manifold 170. Side wall 116 or a portion thereof, as mentioned above, gasket 172, and cover 200 may each have a curvature. In one embodiment, the curvature of gasket 172 is approximately equal to the curvature of the curved portion of side wall 116. In another embodiment, gasket 172 and cover 200 each has a curvature that is approximately equal to the curvature of the portion of side wall 116 that second pass flues 140 extend through.

Inlets 173 of gasket 172 each include at least one flexible portion 174 and at least one contacting surface 176. Contacting surfaces 176 are connected, directly or indirectly, to one of the flexible portions 174. Upon inlets 173 receiving second pass flues 140, contacting surfaces 176 contact end portion 148*b* of second pass flues 140 that are received by inlets 173. Preferably, contacting surfaces 176 form an air tight seal with each respective end portion 148*b* of second pass flue 140. Contacting surfaces 176 may be affixed to end portion 148*b* of second pass flue 140 by any suitable means, such as, e.g., mechanical means including welding, binding, treading, riveting, pressure, etc. and non-mechanical means, such as, adhesives or the like.

Flexible portion 174 is configured to be flexible to enable exhaust manifold 170 to create a seal with end portion 148*b* of second pass flue 140, e.g., by way of contacting surfaces 176 with second pass flues 140. Flexible portion 174 enables inlet 173 to tolerate slight deviations in the angle or size of second pass flues 140. Flexible portion 174 may be configured as a bellows having one or more bends 178. Although flexible portions 174 are illustrated in FIGS. 5A-6B as bellows having two bends 178, flexible portions 174 may have any suitable number of bends 178. Bends 178 may include any curvature and/or directional change in a section of flexible portions 174. Suitable materials for contacting surfaces 176 and/or flexible portion 174, include, e.g., silicone, neoprene, or other similarly flexible materials that sufficiently provide a seal between the contacting surfaces 176 and second pass flues 140.

Figure 15B:
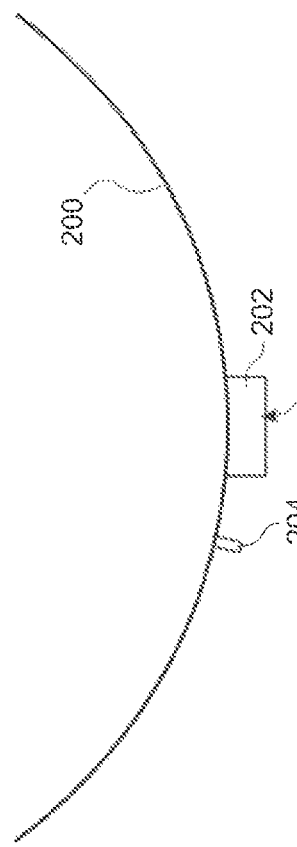
FIG. 15B is a cross-sectional view of the cover of the gas manifold of FIG. 15A.
Figure 15C:
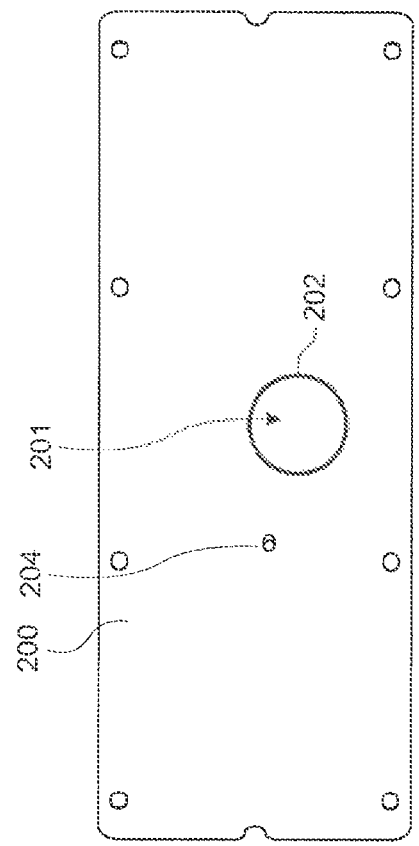
FIG. 15C is a front view depicting the cover of FIG. 15A.
Figure 15A:
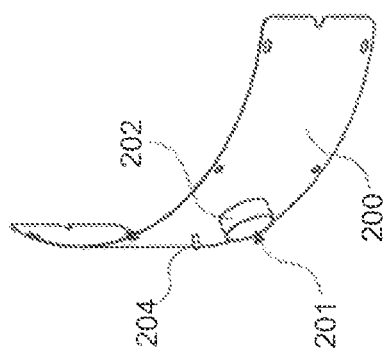
FIG. 15A is a perspective view of an embodiment of a cover of the gas manifold in accordance with aspects of the invention.

Referring to FIGS. 15A-15C, cover 200 of exhaust manifold 170 may include an outlet port 202, defining an outlet 201, and/or an exhaust pressure port 204. Outlet port 202 is in fluid communication with a condensation trap 210 for exhausting combustion gases collected in exhaust manifold 170 and for removing collected condensate. Desirably, at least a portion of outlet 201, as defined by outlet port 202 of cover 200, is positioned at a lower elevation relative to each of inlets 173 of gasket 172. In one embodiment, the entirety of outlet 201 is positioned at an elevation lower than each of inlets 173.

Cover 200 and gasket 172 may be secured together, thereby forming exhaust manifold 170 defining a chamber for receiving combustion gases from second pass flues 140 that terminate therein. Gasket 172 and/or cover 200 may include sealing beads 186 and/or 188 to facilitate the formation of a seal between gasket 172 and cover 200. Preferably, the seal between gasket 172 and cover 200 is water tight and, more preferably, air tight.

Figure 9B:
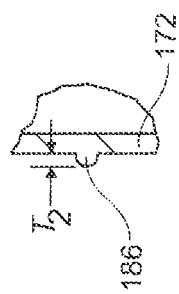
FIG. 9B-9C are enlarged views of portions of the gasket depicted in FIG. 9A.
Figure 9C:
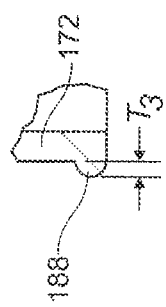
Figure 9A:
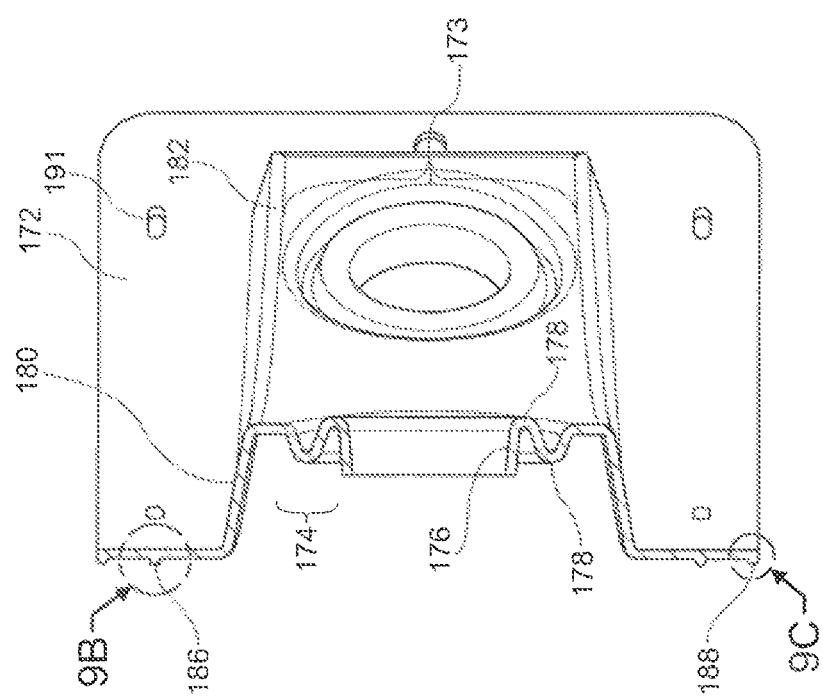
FIG. 9A is a cross-sectional view of the gasket of FIGS. 5A-5B.

In one embodiment, depicted in FIGS. 9A-9C, gasket 172 has peripheral sealing beads 188 and interior sealing beads 186. Peripheral sealing beads 188 may have a thickness T3 that is different than the thickness T2 of interior sealing beads 186. The sealing beads 186 and/or 188 may have a thickness that varies along a length of the sealing beads 186 and/or 188. The length of the sealing bead 186 and/or 188 may correspond to length L2 of gasket 172. For example, as depicted in FIG. 11, interior sealing beads 186 may have a thickness T5 (a combined thickness of the gasket 172 and one of the sealing beads 186) at middle portion 180 that decreases from middle portion 180 along length L2 toward side portions 182 of interior sealing beads 186. In one embodiment, the thickness of interior sealing beads 186 decreases uniformly from T5 at middle portion 180 to the thickness T4 at side portions 182. In another embodiment, the thickness of interior sealing beads 186 decreases with gradual steps from T5 at middle portion 180 to the thickness T4 at side portions 182. Side portions 182*a* and 182*b* may have an equal thickness T4.

Gasket 172 and/or cover 200 may be secured to outer jacket or shell 118 and/or side wall 116 of water heater 100 by any suitable means including mechanical means, such as riveting, bolting, welding etc., and non-mechanical means, such as, adhesives or the like. As depicted in FIGS. 12-14, gasket 172 may be mechanically secured to the outer jacket or shell 118 and/or cover 200 by way of side attachment pads 190 and center attachment pads 196. Side attachment pads 190 and center attachment pads 196 define apertures 191 and 197, respectively. A mechanical means for securing gasket 172 to the outer jacket or shell 118 may extend through apertures 191 and 197 such as, e.g., rivets, screws, bolts, nails, etc. Side attachment pads 190 has a distal portion 192 and a proximal portion 194.

Distal portion 192 preferably has a thickness T6 that is greater than the thickness T7 of proximal portion 194. In one embodiment, thickness T6 of distal portion 192 is more than twice as thick as thickness T7 of proximal portion 194. Although center attachment pad 196 is configured to have a periphery portion 198, defining aperture 197, that has a uniform thickness, center attachment pad 196 may also have a proximal portion and a distal portion having different thicknesses. Additionally or alternatively, interior sealing beads 186 may be connected to and/or integrally formed with attachment pads 190 and/or 196. The thickness (e.g., T4) of a portion of sealing beads 186 that is proximal to attachment pads 190 and/or 196 may be different from the thickness (e.g. T5) of a portion of sealing beads 186 that is distal to attachment pads 190 and/or 196. In one embodiment, the thickness (e.g., T4) of the portion of sealing beads 186 that is proximal to attachment 190 and/or 196 is similar to the thickness of attachment pads 190 and/or 196.

Preferably, water heater 100 includes a condensation trap 210. One of skill in the art would readily understand that any condensation trap capable of separating combustion gases and condensate may be employed without deviating from the contemplated invention.

In one embodiment, depicted in FIGS. 16A-16D, condensation trap 210 has a heat exchanger inlet 212, an exhaust outlet 216, a downstream condensate inlet 220, and a condensate outlet 218. Condensate and combustion gases received from heat exchanger 130 enter condensation trap 210 by way of heat exchanger inlet 212. Under gravity, condensation flows to a lower elevation in condensation trap 210, e.g., into receiving chamber 223, while the combustion gasses ultimately flow to exhaust outlet 216.

Condensation trap 210 advantageously employs a dividing wall 222 to separate condensate outlet 218 and exhaust outlet 216. For example, dividing wall 222 may extend longitudinally between opposite sides of an inner surface of condensation trap 210 to define a receiving chamber 223 and a disposing chamber 225. Dividing wall 222 may subsequently further extend radially to encapsulate disposing chamber 225, such that condensate flowing into condensation trap 210 flows into receiving chamber 223.

Receiving chamber 223 is in fluid communication with disposing chamber 225 by way of condensate passageway 224. By positioning condensate passageway 224 at an elevation lower than condensate outlet 218, and preferably, heat exchanger inlet 212, condensate pools in chambers 223 and 225 to an elevation higher than condensate passageway 224, thereby restricting the combustions gases from flowing through condensate passageway 224 and into disposal chamber 225.

Downstream condensate inlet 220 facilitates flow of condensation from exhaust conduit 232 and/or blower 230 into condensation trap 210. As depicted in FIG. 19, downstream condensation inlet 220 is, preferably, in fluid communication with disposal chamber 225 so that pressure associated with combustion gas received by condensation trap 210 does not reduce the flow of condensation through downstream condensation inlet 220. Condensation outlet 218 may be configured to have a lip 217 that reduces air from flowing into condensation trap 210 by way of condensation outlet 218.

Additionally or alternatively, condensation trap 210 may include short connectors 214a and/or 214b to form airtight and/or water tight seals, e.g., between heat exchanger inlet 212 and outlet port 202 and/or exhaust outlet 216 of condensate trap 210 and exhaust conduit 232. In one embodiment, condensation trap 210 includes a screw cap 226, thereby enabling easy removal of condensation and/or access to condensate trap 210.

Water heater 100 may have a blower 230 to produce pressure, e.g., negative or positive pressure depending on the positioning of blower 230, to facilitate flow of the combustion gases through heat exchanger 130, condensation trap 210, and/or exhaust conduit 232. Suitable blowers and/or compressors will be understood by one of skill in the art.

Pressure switch(es) may be employed to determine the pressure magnitude in various section of water heater 100, e.g., the heat exchanger 130, exhaust manifold 170, condensation trap 210, exhaust conduit 232, and/or blower 230. For example, a pressure switch may be in fluid communication with pressure port 204 to determine the pressure associated with exhaust manifold 170. In one embodiment, a pressure switch is in fluid communication with exhaust manifold 170 and a portion of water heater 100 downstream of condensation trap 210, e.g., exhaust conduit 232, blower 230, etc., to determine a pressure magnitude. Preferably, water heater 100 is configured to identify an obstruction in the flow of combustion gases based on the pressure magnitude determined by the pressure switch being associated with a pressure port 204.

Water heater 100 may also include a control unit 158 having a gas valve and thermostat. The control unit 158 includes an inlet for receiving combustion fuel, e.g., combustible gas. A thermocouple 159 extending from the control unit 158 measures the water temperature inside the water storage tank 110. Apertures are provided in the outer shell 118 and water storage tank 110 to accommodate thermocouple 159. In operation, the control unit 158 may compare the temperature reported by thermocouple 159 with the temperature setting of the thermostat (set by the user) and adjusts the amount of gas provided to gas burner 152 accordingly.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A water heater comprising:
    a water storage tank configured to store water to be heated, the water storage tank having a curved wall;
    a heat exchanger configured to transfer heat to water stored in the water storage tank, the heat exchanger including a plurality of flues each extending through the water storage tank and exiting the water storage tank through the curved wall of the water storage tank, wherein each of the flues has an end portion that is oriented at an angle relative to the other end portions of the flues and substantially normal to the curved wall of the water storage tank; and
    an exhaust manifold associated with the curved wall of the water storage tank, the exhaust manifold including a gasket defining inlets receiving each of the ends of the flues, and a cover enclosing the ends of the flues and defining an outlet for the delivery of combustion gases and condensation from the exhaust manifold;
    wherein the cover is substantially flush with an outer jacket or shell of the water heater.

2. The water heater of claim 1, wherein the tank wall, the gasket, and the cover each has a curvature, the curvature of the gasket and the curvature of the cover each being approximately equal to the curvature of the curved wall.

3. The water heater of claim 1, wherein each of the inlets of the gasket further comprises at least one flexible portion and at least one contacting surface, the at least one contacting surface being connected to the at least one flexible portion.

4. The water heater of claim 3, wherein the flexible portion has one or more bends.

5. The water heater of claim 4, wherein the at least one flexible portion of each of the inlets has two or more bends.

6. The water heater of claim 3, wherein the contacting surface of the at least one flexible portion is configured to contact one of the plurality of flues.

7. The water heater of claim 1, wherein at least a portion of the outlet of the cover is positioned at a lower elevation relative to each of the inlets of the gasket.

8. The water heater of claim 1, wherein the gasket has a sealing bead, the sealing bead further having a length and a thickness, and the thickness of the sealing bead varying along the length of the sealing bead.

9. The water heater of claim 8, wherein the gasket further has a middle portion and a side portion, the thickness of the sealing bead decreasing from the middle portion of the gasket along the length toward the side portion of the gasket.

10. The water heater of claim 3, wherein the manifold further includes a fitting positioned adjacent to the curved wall.

11. The water heater of claim 10, the fitting being positioned around one of the plurality of flues.

12. A water heater comprising:
a water storage tank configured to store water to be heated, the water storage tank having a top wall, a bottom wall, and a side wall extending between the top wall and the bottom wall, the side wall including a curved portion;
a heat exchanger configured to transfer heat to water stored in the water storage tank, the heat exchanger including a first pass flue extending between the bottom wall of the water storage tank and the top wall of the water storage tank, and a plurality of second pass flues coupled to receive combustion gases from the first pass flue, each of the plurality of second pass flues exiting the water storage tank through the side wall of the water storage tank; and
an exhaust manifold associated with the side wall of the water storage tank, the exhaust manifold including a gasket defining inlets for receiving each of the second pass flues, and a cover defining an outlet from the exhaust manifold;
wherein the outlet defined by the cover is oriented to extend in a direction radially outward from the cover.

13. The water heater of claim 12, wherein each of the second pass flues has a first end and a second end, the second end terminating within the exhaust manifold.

14. The water heater of claim 13, wherein the second pass flues exit through the curved portion of the side wall.

15. The water heater of claim 14, wherein the second ends of the second pass flues are parallel to each other.

16. The water heater of claim 14, wherein the curved portion of the side wall has a curvature and the gasket has a curvature, the curvature of the gasket being approximately equal to the curvature of the curved portion of the side wall.

17. The water heater of claim 12, further comprising a pressure switch, the pressure switch sensing a pressure associated with the exhaust manifold.

\* \* \* \* \*